United States Patent
Okuyama et al.

(10) Patent No.: US 10,322,540 B2
(45) Date of Patent: Jun. 18, 2019

(54) BLOW MOLDING DEVICE

(71) Applicant: DISCMA AG, Hunenberg (CH)

(72) Inventors: Yuichi Okuyama, Kanagawa (JP);
Kenichi Suyama, Kanagawa (JP)

(73) Assignee: Discma AG, Zürich (CH)

( * ) Notice: Subject to any disclaimer, the term of this patent is extended or adjusted under 35 U.S.C. 154(b) by 0 days.

(21) Appl. No.: 15/500,817

(22) PCT Filed: Jul. 28, 2015

(86) PCT No.: PCT/JP2015/003783
§ 371 (c)(1),
(2) Date: Jan. 31, 2017

(87) PCT Pub. No.: WO2016/017153
PCT Pub. Date: Feb. 4, 2016

(65) Prior Publication Data
US 2017/0210052 A1 Jul. 27, 2017

(30) Foreign Application Priority Data
Jul. 31, 2014 (JP) ................................ 2014-157005

(51) Int. Cl.
*B29C 49/42* (2006.01)
*B29C 49/46* (2006.01)
*B29C 49/64* (2006.01)
*B29C 49/56* (2006.01)
*B29C 49/08* (2006.01)
*B29C 49/58* (2006.01)
*B29C 49/28* (2006.01)
*B29C 49/16* (2006.01)
*B29C 49/32* (2006.01)
*B29C 49/48* (2006.01)

(52) U.S. Cl.
CPC .......... *B29C 49/6409* (2013.01); *B29C 49/08* (2013.01); *B29C 49/28* (2013.01);
(Continued)

(58) Field of Classification Search
CPC .............. B29C 49/32; B29C 2049/325; B29C 49/6409; B29C 49/4205; B29C 49/46;
(Continued)

(56) References Cited

U.S. PATENT DOCUMENTS 3,396,427 A * 8/1968 Raspante ................ B29C 49/32
264/540
3,837,780 A * 9/1974 Strong .................... B29C 49/28
425/297

(Continued)

FOREIGN PATENT DOCUMENTS

EP 2607052 A1 6/2013
JP H10-503135 A 3/1998
(Continued)

*Primary Examiner* — Robert B Davis
(74) *Attorney, Agent, or Firm* — Eric J. Sosenko; Jonathan P. O'Brien; Honigman LLP

(57) ABSTRACT

A blow molding device for blow molding preforms into a predetermined shape. The blow molding device includes a batch-type mold provided with cavities, a heating furnace that heats preforms while the preforms are arranged in series, a transfer machine that simultaneously transfers the preforms as a batch to the cavities of the mold after the preforms are heated and sent out sequentially from the heating furnace, and a pressurized liquid feeder that feeds pressurized liquid to the preforms after the preforms are arranged in all of the cavities of the mold and the mold is closed.

9 Claims, 2 Drawing Sheets

(52) U.S. Cl.
CPC .......... *B29C 49/4205* (2013.01); *B29C 49/46* (2013.01); *B29C 49/56* (2013.01); *B29C 49/58* (2013.01); *B29C 49/16* (2013.01); *B29C 2049/325* (2013.01); *B29C 2049/4221* (2013.01); *B29C 2049/465* (2013.01); *B29C 2049/4869* (2013.01)

(58) Field of Classification Search
CPC ...... B29C 2049/465; B29C 2049/4655; B29C 2049/4664
See application file for complete search history.

(56) References Cited

U.S. PATENT DOCUMENTS

| | | | | |
|---|---|---|---|---|
| 4,690,633 A | * | 9/1987 | Schad | ...................... B29C 49/28 264/535 |
| 5,783,232 A | | 7/1998 | Roos et al. | |
| 6,082,991 A | * | 7/2000 | Rozenberg | ............ B29C 49/064 264/537 |
| 6,457,967 B1 | * | 10/2002 | Suzuki | .................... B29C 49/28 425/526 |
| 7,727,454 B2 | * | 6/2010 | Freire-Diaz | ............ B65G 23/30 198/468.3 |
| 7,914,726 B2 | * | 3/2011 | Andison | ................. B29C 49/46 264/523 |
| 8,206,144 B2 | * | 6/2012 | Ng | ....................... B29C 49/4205 198/803.4 |
| 2012/0299224 A1 | * | 11/2012 | Cooper | ................... B29C 49/12 264/524 |

FOREIGN PATENT DOCUMENTS

| | | |
|---|---|---|
| JP | H10-193446 A | 7/1998 |
| JP | 2003-251685 A | 9/2003 |
| WO | 2011/030677 A1 | 3/2011 |
| WO | 2013/020885 A1 | 2/2013 |

* cited by examiner

BLOW MOLDING DEVICE

TECHNICAL FIELD

This disclosure relates to a blow molding device for blow molding a preform into a container with a predetermined shape, the preform having been formed into a bottomed cylindrical shape using resin material.

BACKGROUND

Resin containers, representative examples of which are oriented polypropylene (OPP) bottles and polyethylene naphthalate (PET) bottles, are used for a variety of purposes, from beverages to food products and cosmetics. Such containers are generally formed by heating resin preform, which has been formed into a bottomed cylindrical shape by injection molding or the like, to a temperature at which a stretching effect can be achieved, and then in this state, feeding pressurized air into the preform while using a stretching rod to blow mold the preform into a predetermined shape (for example, see JP 2003-251685 A).

One known blow molding device that performs such two-axis stretching blow molding is provided with a batch-type mold that includes a plurality of cavities, and using this mold, a plurality of preforms can be blow molded simultaneously. In this case, the preforms are heated by a heating furnace while the preforms are arranged in series and transferred, and the preforms that are sent out from the heating furnace in sequence one at a time are arranged in the cavities of the batch-type mold by a transfer machine. After the preforms are arranged, pressurized air is fed to the preforms in the cavities from a nozzle unit for feeding pressurized air to blow mold the preforms.

SUMMARY

During two-axis stretching blow molding, the time from when a preform heated in the heating furnace exits the heating furnace until the preform is arranged in the cavity and the mold is closed, i.e. the preform transfer time, is an important element that affects specifications such as the total height and volume of the container obtained by blow molding. Therefore, in order to keep the specifications of the molded container constant, it is important to keep the transfer time of each preform constant.

In the aforementioned conventional blow molding device, however, the heating furnace is configured to heat the preforms while the preforms are arranged in series and transferred, and the preforms that are sent out from the heating furnace in sequence are arranged in the cavities by a transfer machine. Therefore, the transfer time of the preforms arranged in the cavities of the mold differs, leading to the problem of variation in the specifications of the containers that are blow molded in the cavities.

Therefore, it would be helpful to provide a blow molding device that, even with a configuration to transfer preforms to cavities in a batch-type mold with different transfer times, can maintain constant specifications of the containers obtained by blow molding the preforms.

A blow molding device according to this disclosure is for blow molding a preform into a predetermined shape, the preform having been formed into a bottomed cylindrical shape using resin material, the blow molding device including:

a batch-type mold provided with a plurality of cavities;

a heating furnace configured to heat a plurality of the preforms while the preforms are arranged in series and transferred;

a transfer machine configured to transfer the preforms to the cavities of the mold after the preforms are heated and sent out sequentially from the heating furnace; and a pressurized liquid feeder configured to feed pressurized liquid to each of the preforms after the preforms are arranged in all of the cavities and the mold is closed.

In the blow molding device according to this disclosure, a time from when a first one of the preforms arranged in the cavities of the mold is sent out from the heating furnace until the preforms after heating are arranged in all of the cavities and the mold is closed is preferably 5 seconds or more to 11 seconds or less.

The blow molding device according to this disclosure preferably further includes two of the molds in parallel for the heating furnace, such that by the transfer machine sorting the preforms sent out from the heating furnace between the two molds, arrangement of the preforms in the cavities and feeding of the pressurized liquid to the preforms are performed alternately between the two molds.

According to this disclosure, liquid blow molding is performed by feeding pressurized liquid into preforms arranged in the cavities of a batch-type mold. Therefore, even if preforms are transferred to the cavities of the batch type mold with different transfer times, the specifications of the containers obtained by blow molding the preforms can be kept constant.

DETAILED DESCRIPTION

With reference to the drawings, examples of this disclosure are now described in detail.

Figure 1:
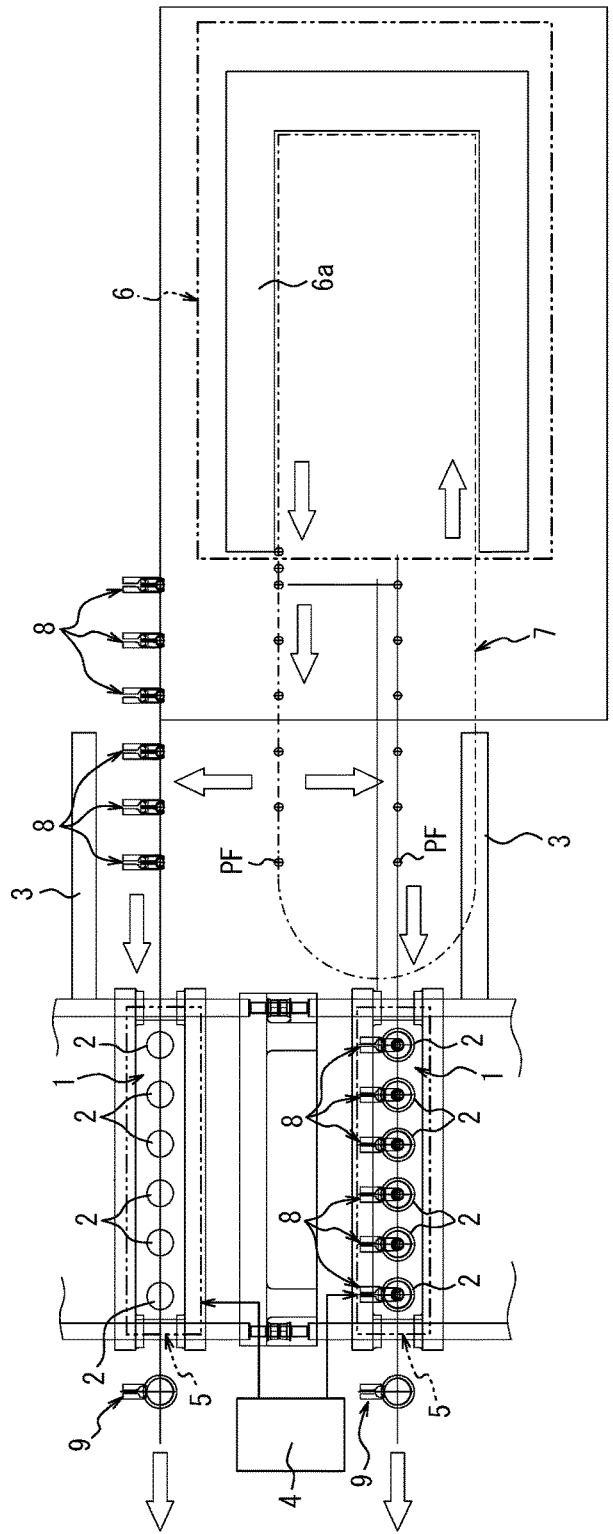
FIG. 1 schematically illustrates a blow molding device in one of the embodiments of this disclosure.

The blow molding device illustrated in FIG. 1, which is one of the embodiments of this disclosure, molds preform PF into a container with a predetermined shape, the preform PF having been formed into a bottomed cylindrical shape using resin material. This embodiment illustrates the case of blow molding the preform PF into a bottle that is filled with a liquid, such as a drink.

As an example of the preform PF that can be blow molded with this blow molding device, fa preform that is formed with a resin material such as polypropylene (PP) or polyethylene naphthalate (PET) can be used.

The blow molding device has a mold 1 for blow molding. The mold 1 is a batch-type mold provided with a plurality of cavities 2, and each cavity is formed in a bottle shape. This embodiment illustrates the case of six cavities 2 being provided in a straight line in the mold 1. While details are not illustrated, the mold 1 can open into left and right portions, and by opening the mold 1, the cavities 2 can be opened all together, and the molded products can be removed from the mold 1. By closing the mold 1 with preforms PF arranged in the cavities 2, preforms PF can be mounted in the cavities 2. Note that the upper surface of the mold 1 opens upward, and the mouth of each preform PF is arranged in this opening.

In this embodiment, the blow molding device is formed of a shuttle type provided with a pair of molds 1. The pair of molds 1 have the same basic structure, are arranged in parallel so that the directions of alignment of the cavities 2 are parallel, and are guided by respective guide rails 3 to be capable of reciprocating linearly to the left and right in FIG. 1.

In order to feed the pressurized liquid into the preforms PF mounted in the cavities 2 of the mold 1, a pressurized liquid feeder 4 is provided in the blow molding device. The pressurized liquid feeder 4 can, for example, be structured to include a plunger pump that is driven by a servomotor.

Respective nozzle units 5 are provided at the upper portion of the molds 1, and the pressurized liquid feeder 4 is connected to these nozzle units 5. The nozzle units 5 are vertically moveable and can abut the upper surface of the molds 1. The nozzle units 5 are provided with a plurality (six in this embodiment) of nozzles (not illustrated) that fit onto the mouth of the preform PF mounted in each cavity 2 of the mold 1 when the nozzle units 5 abut the top surface of the mold 1, and pressurized liquid fed from the pressurized liquid feeder 4 through the nozzle can be fed into the preform PF.

In this embodiment, an individual nozzle unit 5 is provided for each mold 1 of the pair of molds 1, but a configuration such that one nozzle unit 5 is shared by the molds 1 may be adopted. The nozzle unit 5 may be provided with a stretching rod that stretches the preform PF axially during blow molding. Furthermore, the pressurized liquid feeder 4 may be provided with a temperature adjusting device that maintains the temperature of the liquid while circulating the liquid inside the nozzle unit 5.

As the liquid for liquid blow molding that the pressurized liquid feeder 4 feeds into the preform PF, the content liquid that is ultimately filled into the bottle as the product, such as a drink, cosmetic, medicine, or the like may used. This approach allows the step of filling the bottle with the content liquid to be omitted and thus simplifies the production process and the structure of the blow molding device.

The blow molding device has a heating furnace 6 for heating the preform PF to a predetermined temperature. The heating furnace 6 is provided with a heater 6a disposed along a portion of the circumferential path of a conveyer 7 laid in a circular pattern. The heater 6a may be configured by a variety of heating elements, such as a heating wire, a ceramic heater, or the like.

The conveyer 7 is configured to rotate counterclockwise in FIG. 1 and to allow preforms PF to be set at the portion by the entrance to the heating furnace 6. The conveyer 7 can transfer a plurality of preforms PF, which are set sequentially and arranged in series, along the heater 6a. Accordingly, the plurality of preforms PF arranged in series and transferred by the conveyer 7 are heated to a predetermined temperature by the heating furnace 6 and sequentially sent out from the exit of the heating furnace 6.

The conveyer 7 also has a pitch changing function and can align, in series, a plurality (six) of heated preforms PF sent out from the exit of the heating furnace 6, aligning the preforms PF at a pitch corresponding to the pitch of the cavities 2 provided in the mold 1.

The blow molding device is provided with a transfer machine 8 for preforms PF. This transfer machine 8 can, for example, be provided with a plurality of grippers capable of gripping the mouth of the preforms PF. The transfer machine 8 can transfer the plurality of preforms PF to the cavities 2 of the mold 1 after the heated preforms PF have been sent out from the heating furnace 6 and arranged at a predetermined pitch. In this embodiment, before transfer of the preforms PF by the transfer machine 8, the mold 1 is displaced along the guide rail 3 towards the heating furnace 6, and the cavities 2 of the mold 1 are disposed adjacent to the preforms PF aligned in series outside the exit of the heating furnace 6. With the plurality (six) of grippers, the transfer machine 8 holds the plurality (six) of preforms PF aligned in series all together, moves in a direction orthogonal to the displacement direction of the conveyer 7, and arranges the preforms PF in the corresponding cavities 2.

By closing the mold 1, in which the preforms PF heated by the cavities 2 are arranged, the preforms PF can be mounted in the cavities 2. Once mounting of the preforms PF in the cavities 2 is complete, the mold 1 can be displaced along the guide rail 3 to below the nozzle unit 5.

In the illustrated case, the plurality of preforms PF sent out sequentially from the heating furnace 6 are aligned in series at a predetermined pitch and are then transferred to the cavities 2 all together by the transfer machine 8, but this example is not limiting. A structure may be adopted so that each time one of the preforms PF is sent out from the heating furnace 6, it is transferred to one of the cavities 2 by the transfer machine 8.

Also, in the illustrated case, the mold 1 can freely move linearly along the guide rail 3, and before the preforms PF are transferred by the transfer machine 8, the mold 1 is displaced to a position adjacent to the outside of the exit of the heating furnace 6, and the preforms PF are then transferred by the transfer machine 8 to the cavities 2, but this example is not limiting. For example, as depicted for the mold 1 at the bottom of FIG. 1, instead of displacing the molds 1 from below the nozzle unit 5, the plurality of preforms PF aligned in series at the exit of the heating furnace 6 may be sorted to the left and right for the respective molds, and the sorted plurality of preforms PF may be transferred by the transfer machine 8 all together to the cavities 2 of the molds 1 positioned below the nozzle unit 5.

The pair of molds 1 are configured so that processes are executed by shifting the cycles of the processes by 180° from each other, so that arrangement of the preforms PF in the cavities 2 of the molds 1 and feeding of pressurized liquid into the preforms PF arranged in the cavities 2 (liquid blow molding) are performed alternately between the molds 1.

Next, the procedures for forming bottles (containers) by liquid blow molding preforms PF using such a blow molding device are described.

First, the preforms PF are sequentially set in the conveyer 7, and a plurality of preforms PF are heated by the heating furnace 6. These preforms PF are sequentially heated by the heating furnace 6 while being arranged in series and transferred by the conveyer 7. Once the plurality of preforms PF are sequentially sent out from the heating furnace 6 and aligned in series at a predetermined pitch, the plurality of preforms PF are transferred all together by the transfer machine 8 and arranged in the open cavities 2 corresponding to one of the molds 1. After the heated preforms PF are arranged in all of the cavities 2 in this way, the mold 1 is closed to mount the preforms PF in the corresponding cavities 2.

Next, the mold 1 with preforms PF mounted in the cavities 2 is displaced along the guide rail 3 to below the nozzle unit 5. The nozzle unit 5 is lowered toward the upper surface of the mold 1, the nozzles thereof fit in the mouth of the preforms PF, and pressurized liquid is fed into the preforms PF from the pressurized liquid feeder 4 via the nozzle unit 5. As a result, liquid blow molding is performed simultaneously on the preforms PF. During this liquid blow molding, each preform PF is stretched horizontally (radially)

by the pressure of the liquid fed from the pressurized liquid feeder 4 while being stretched vertically (axially) by a stretching rod (not illustrated) provided in the nozzle unit 5 so as to be formed into a bottle shaped along the cavity 2 of the mold 1.

After this liquid blow molding, a suck back process to cause the pressurized liquid feeder 4 to suction liquid may be performed as necessary to adjust the amount of liquid filled into the molded bottle.

Once the liquid blow molding is complete, the mold 1 is opened, and the bottle filled with liquid as the content liquid is removed from the mold 1 by a removal device 9 as a finished product.

When liquid blow molding is being performed on the preforms PF of one of the molds 1, the other mold 1 is displaced to a position adjacent to the heating furnace 6, and the plurality of preforms that are sequentially sent out from the heating furnace 6 and aligned in series at a predetermined pitch are arranged in the cavities 2 by the transfer machine 8. In this way, mounting of the preforms PF in the cavities 2 and liquid blow molding are performed alternately in each mold 1. As a result, the product manufacturing cycle of this blow molding device can be improved.

With the aforementioned blow molding device, a plurality of preforms PF arranged in the plurality of cavities 2 of the mold 1 are heated by the heating furnace 6 while being arranged in series and transferred by the conveyer 7, are sent out sequentially from the heating furnace 6, are aligned at a predetermined pitch, and are then transferred all together to the corresponding cavities 2. Therefore, the transfer time differs for each of the plurality of preforms PF mounted in the cavities 2. With this blow molding device, however, the preforms PF mounted in the cavities 2 of the mold 1 are blow molded using pressurized liquid, not pressurized air. Therefore, even though the transfer time differs, the plurality of preforms PF can be molded into bottles with constant specifications, i.e. with small variation in the specifications such as the total height and volume. In other words, bottles with desired specifications can be manufactured stably from a plurality of preforms PF with different transfer times. The transfer time of the preform refers to the time from when the preform PF leaves the heating furnace 6 until the mold 1 in which the preform PF is mounted closes.

In particular, in this blow molding device, the time from when the first one of the preforms PF that are arranged in the cavities 2 of the mold 1 is sent out from the heating furnace 6 until heated preforms PF are arranged in all of the cavities 2 and the mold 1 is closed is preferably 5 seconds or more to 11 seconds or less. In other words, the transfer times of all of the plurality of preforms PF that are subjected to liquid blow molding simultaneously in one mold 1 are preferably set to be 5 seconds or more to 11 seconds or less. By adopting this setting, the variation in the specifications of the bottles after liquid blow molding can be further reduced.

In order to test the variation in the specifications of the bottles after liquid blow molding of preforms PF with different transfer times, we performed an experiment by using polypropylene (PP) as the preforms PF, heating the preforms PF to 135° C. in the heating furnace 6, setting the temperature of liquid fed into the preforms PF by the pressurized liquid feeder 4 to 20° C., and adopting the same molding conditions as in the aforementioned blow molding device. While changing the transfer time of the preforms PF one second at a time from 5 seconds to 13 seconds, we molded bottles with a volume of 385 ml by performing liquid blow molding five times for each transfer time. Table 1 lists the results. This volume is the maximum volume of the molded bottle. Table 1 lists the volume (ml) of each molded bottle, the average (Avg.) thereof, and the difference between the maximum and minimum, i.e. the variation (R), at each transfer time.

TABLE 1

| | Transfer time (seconds) | | | | | | | | |
|---|---|---|---|---|---|---|---|---|---|
| | 5 | 6 | 7 | 8 | 9 | 10 | 11 | 12 | 13 |
| 1 | 385.7 | 384.7 | 384.0 | 384.7 | 385.1 | 384.3 | 384.4 | 384.9 | 383.9 |
| 2 | 385.9 | 384.1 | 383.7 | 385.0 | 385.3 | 383.6 | 382.8 | 384.5 | 382.3 |
| 3 | 385.5 | 383.8 | 384.6 | 384.1 | 385.7 | 383.7 | 383.6 | 383.4 | 383.4 |
| 4 | 385.1 | 384.5 | 383.2 | 385.4 | 384.5 | 383.7 | 383.4 | 382.1 | 382.3 |
| 5 | 385.7 | 384.7 | 383.4 | 385.1 | 384.2 | 383.3 | 383.3 | 383.7 | 381.8 |
| Avg. | 385.6 | 384.3 | 383.8 | 384.8 | 384.9 | 383.7 | 383.5 | 383.7 | 382.7 |
| R | 0.8 | 0.9 | 1.4 | 1.3 | 1.5 | 1.0 | 1.6 | 2.8 | 2.1 |

Figure 2:
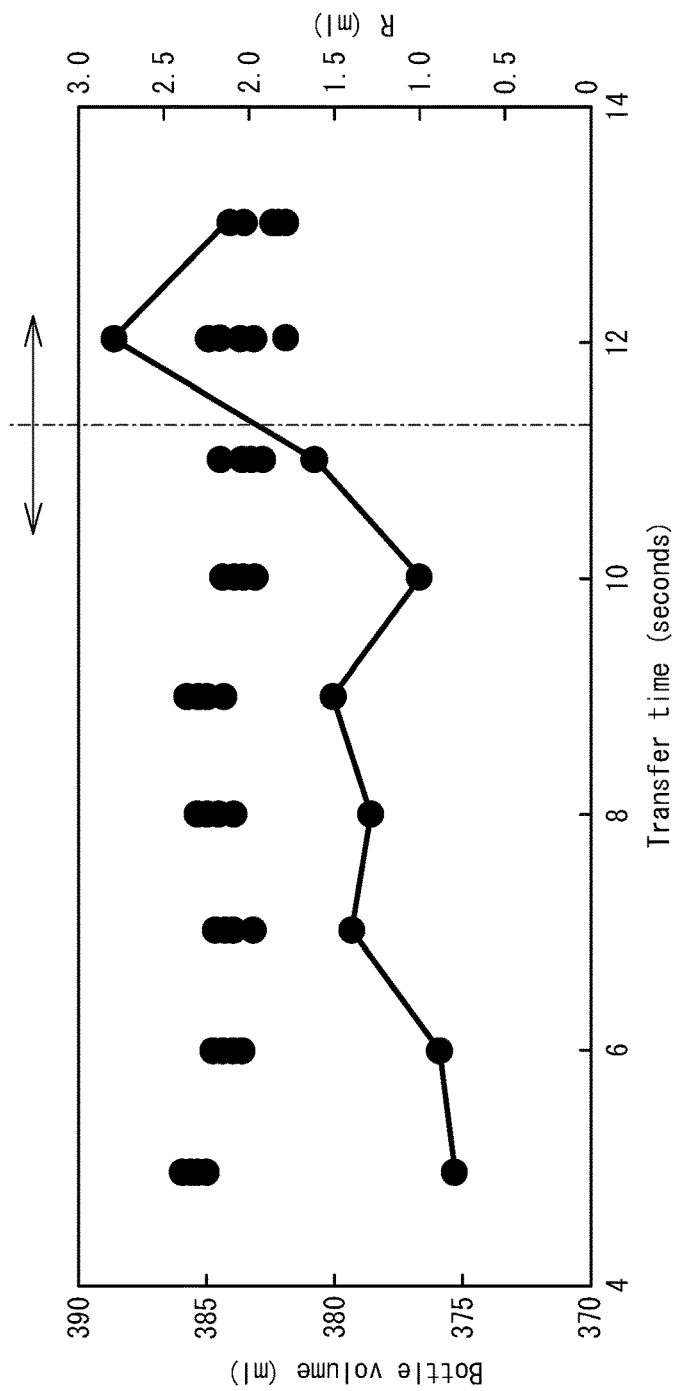
FIG. 2 illustrates the relationship of the preform transfer time to the volume of the blow molded bottle and the variation in the volume.

Among the experiment results listed in Table 1, FIG. 2 illustrates the relationship of the preform transfer time to the volume of the blow molded bottle and the variation R in the volume.

Table 1 and FIG. 2 show that by blow molding preforms PF using the blow molding device of this disclosure, so that the preforms PF mounted in the cavities 2 of the mold 1 are blow molded using pressurized liquid instead of pressurized air, the change in the volume of the bottles formed by blow molding the preforms PF can be reduced, and the bottles can be formed to have constant specifications, even if the transfer time of the preforms PF increases.

In particular, as illustrated in FIG. 2, if the time from when the first preform PF that is arranged in the cavity 2 of the mold 1 is sent out from the heating furnace 6 until heated preforms PF are arranged in all of the cavities 2 and the mold 1 is closed is 5 seconds or more to 11 seconds or less, variation in the specifications of the bottles can be reduced more effectively. By contrast, if the transfer time of the preforms PF is greater than 11 seconds, the variation R in the specifications of the blow molded bottles in the case of the same transfer time increases.

This disclosure is not limited to the above embodiment, and a variety of modifications may be made without departing from the scope of this disclosure.

For example, in the above embodiment, six cavities 2 are arranged in series in each mold 1, but this example is not limiting. The number and arrangement of the cavities 2 may be set freely.

In the above embodiment, the pressurized liquid feeder 4 is a plunger pump driven by a servomotor, but this example is not limiting. The pressurized liquid feeder 4 may be driven by another driving mechanism, such as a hydraulic cylinder, air cylinder, or the like.

Furthermore, instead of providing a stretching rod in the nozzle unit 5, the preforms PF may be stretched by being expanded in both the vertical direction (axially) and the horizontal direction (radially) only by the pressure of the liquid fed from the pressurized liquid feeder 4.

The invention claimed is:
1. A blow molding device for blow molding a preform into a predetermined shape, the preform having been formed into a bottomed cylindrical shape using resin material, the blow molding device comprising:
   two batch molds, each of the batch molds provided with a plurality of cavities, the two batch molds being positioned in parallel;

a heating furnace configured to heat a plurality of the preforms while the preforms are arranged in series and sequentially send out the preforms from the heating furnace;

a transfer machine configured to alternately transfer the preforms simultaneously as a batch to the cavities of the two batch molds after the preforms are heated and sent out sequentially from the heating furnace; and a pressurized liquid feeder having a single injection head configured to alternately feed pressurized liquid to each of the preforms in the two batch molds after the preforms are arranged in all of the cavities and the mold is closed.

2. The blow molding device of claim 1, wherein for the batch of preforms, a time from when a first one of the preforms is sent out from the heating furnace until the batch of the preforms is arranged in all of the cavities and the mold is closed is in the range of 5 seconds to 11 seconds.

3. A method of blow molding a preform into an article of predetermined shape, the method comprising the steps of:
providing a series of preforms having a closed bottomed cylindrical shape formed of resin material;
sequentially heating the series of preforms in a heating furnace;
sequentially exiting the series of preforms from the heating furnace;
defining batches of preforms from the series of the preforms exiting the heating furnace each batch including a first preform to exit the heating furnace and a last preform to exit the heating furnace;
as a unit, transferring a first batch of the batches of preforms into a first batch mold that is open, the first batch mold having a plurality of cavities each of which receives one preform of the first batch of preforms;
as a unit, transferring a second batch of the batches of preforms into a second batch mold that is open, the second batch mold having a plurality of cavities each of which receives one preform of the second batch of preforms;
closing the first and second batch molds to retain the preforms therein, the closing of the first and second batch molds occurring within a range of 5 to 11 seconds after the first preform of a respective batch of the preforms exits the heating furnace;
injecting a pressurized liquid into each of the preforms in the first and second batch molds using a single injection head thereby radially and axially expanding the preforms into conformity with the cavities and forming first and second batches of articles of the predetermined shape; and
removing the articles from the first and second batch molds with the injected liquid located within the articles.

4. The method according to claim 3, further comprising the step of aligning the preforms at a first pitch, wherein the series of the preforms are heated in the heating furnace while aligned at the first pitch.

5. The method according to claim 4, further comprising the step of aligning the batch of preforms at a second pitch, the second pitch being different from the first pitch and corresponding to the cavities of the batch mold.

6. The method according to claim 3, wherein the injecting step includes lowering an injection head to engage nozzles of the injection head with the batch of preforms.

7. The method according to claim 3, further comprising the steps of defining a second batch of preforms from the series of the preforms exiting the heating furnace, simultaneously transferring the second batch of the preforms into a second batch mold that is open, closing the second batch mold to retain the second batch of preforms therein, the closing of the second batch mold occurring within a range of 5 to 11 seconds after a first preform of the second batch of preforms exits the heating furnace.

8. The method according to claim 7, wherein the successive batches of preforms are alternatingly transferred to the batch mold and the second batch mold.

9. A method of blow molding a preform into an article of predetermined shape, the method comprising the steps of:
providing a series of preforms having a closed bottomed cylindrical shape formed of resin material;
sequentially heating the series of preforms in a heating furnace;
sequentially exiting the series of preforms from the heating furnace;
defining a batch of preforms from the series of the preforms exiting the heating furnace, the batch including a first preform to exit the heating furnace and a last preform to exit the heating furnace;
simultaneously transferring the batch of the preforms into a batch mold that is open, the batch mold having a plurality of cavities each of which receives a preform of the batch of preforms;
closing the batch mold to retain the batch of preforms therein, the closing of the batch mold occurring within a range of 5 to 11 seconds after the first preform of the batch of preforms exits the heating furnace;
defining a second batch of preforms from the series of the preforms exiting the heating furnace;
simultaneously transferring the second batch of the preforms into a second batch mold that is open;
in the simultaneously transferring steps, successive batches of preforms being alternatingly transferred to the batch mold and the second batch mold;
closing the second batch mold to retain the second batch of preforms therein, the closing of the second batch mold occurring within a range of 5 to 11 seconds after a first preform of the second batch of preforms exits the heating furnace;
injecting a pressurized liquid into each preform of the batch of preforms in the batch mold from an injection head thereby radially and axially expanding the preforms into conformity with the cavities and form a batch of articles of the predetermined shape;
injecting a pressurized liquid into each preform of the second batch of preforms in the second batch mold from the injection head thereby radially and axially expanding the preforms into conformity with the cavities and form a second batch of articles of the predetermined shape;
alternatingly displacing the batch mold and second batch mold to a position adjacent to the injection head prior to the injecting step; and
removing the articles from the batch mold and the second batch mold with the injected liquid located within the articles.

* * * * *